Oct. 20, 1931.                R. L. DEZENDORF                1,827,974
                                 GAS METER
                              Filed July 7, 1928
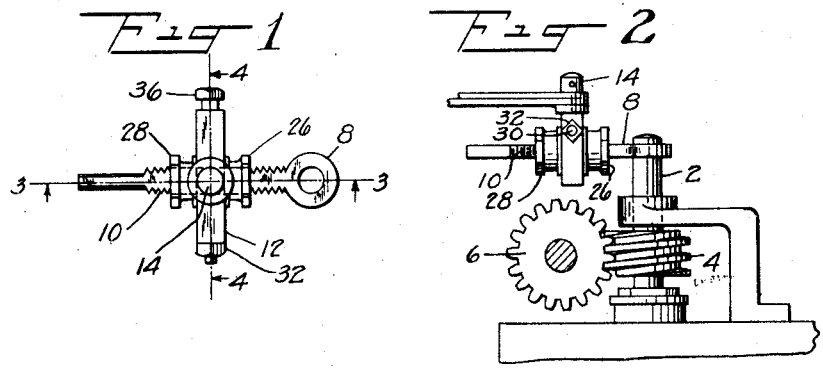
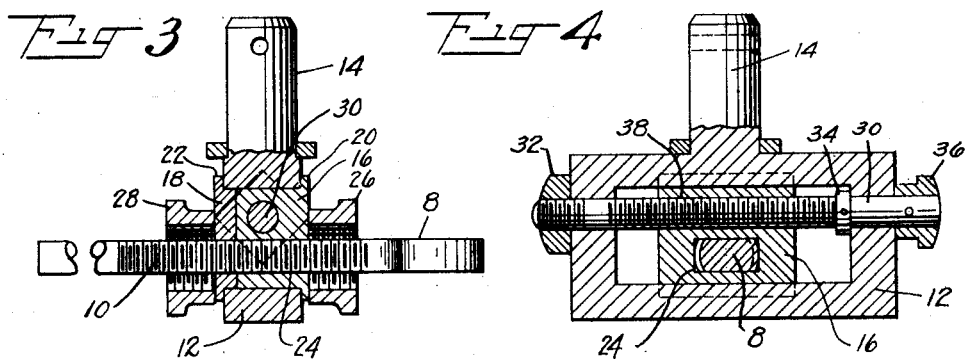
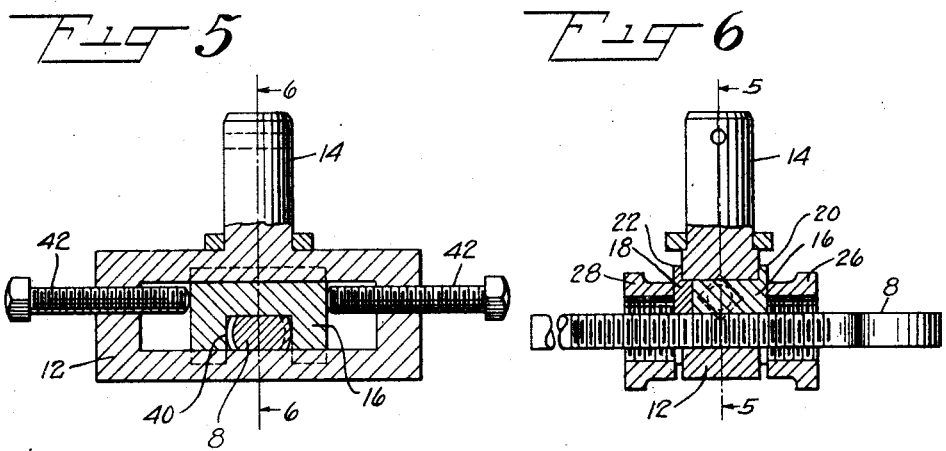
INVENTOR.
R. L. Dezendorf
BY
ATTORNEYS.

Patented Oct. 20, 1931

1,827,974

UNITED STATES PATENT OFFICE

RICHARD LEE DEZENDORF, OF HOLLIS, NEW YORK

GAS METER

Application filed July 7, 1928. Serial No. 291,067.

My invention relates to improvements in gas meters and has for its object to provide a new and improved means for supporting and adjusting tangent posts. It also has for its object to provide a guide embracing the tangent and coacting with a tangent post yoke. It also has for its object to provide a tangent embracing guide which can be easily introduced into the yoke.

The following is a description of an embodiment of my invention, reference being had to the accompanying drawings, in which:

Figure 1 shows a plan view of a portion of a meter embodying my invention;

Fig. 2 is a side elevation of the same, shown in connection with the driving shaft and indicator operating gears;

Fig. 3 is an enlarged sectional view on the line 3—3, Fig. 1;

Fig. 4 is an enlarged sectional view on the line 4—4, Fig. 1;

Figs. 5 and 6 are views of a modification, Fig. 5 being a sectional view on the line 5—5, Fig. 6 and Fig. 6 being a sectional view on the line 6—6, Fig. 5.

Referring more particularly to the drawings, 2 is a meter shaft having the usual worm 4 driving the gear 6 connected to the indicator train (not shown). 8 is the tangent secured to the shaft 2 and having its sides screw-threaded as at 10. 12 is a yoke carrying the tangent post 14 and embracing the tangent and also a guide composed of two parts 16 and 18 embracing the tangent. This guide is provided with flanges 20 and 22 which act as guides for the tangent yoke. It is provided with a passage 24 which extends through both portions of the guide and through which the tangent 8 extends. 26 and 28 are two clamping and adjusting nuts which engage the outer faces of the two parts of the guide, holding the two parts together and also clamping them in desired position against movement lengthwise of the tangent. The flanges 20 and 22 are so spaced as to make a close but not binding engagement with the yoke when the two parts of the guide are clamped together, thus providing grooves in which the yoke is guided.

30 is an adjusting screw passing through the yoke and provided with a lock nut 32. This screw is provided with a collar 34 and an angular head 36 which holds the screw against longitudinal movement relatively to the yoke. The threads on this screw make engagement with a screw-threaded perforation 38 passing through one of the members of the guide. In this form the passage 24 is a perforation.

In the form shown in Figs. 5 and 6 the tangent passage through the guide is a passage 40 open at one side, and the adjusting means consists of two screws 42 which make screw-threaded engagement with holes in opposite ends of the yoke and have their ends contacting with the sides of the guide. The guide in this case also is made of two pieces and is provided with upwardly and downwardly extending flanges forming guiding surfaces for the yoke.

With the constructions shown a guide is provided which can be easily introduced into the yoke and acts to guide the yoke without being clamped in position relatively to the guide, the two parts of the guide being held together by the adjusting nuts 26 and 28 and held by such nuts against movement longitudinally of the tangent.

In the form shown in Figs. 1 to 4 the yoke is adjusted relatively to the guide by turning the screw 30 which screw is locked in position by the lock nut 32.

In the form shown in Figs. 5 and 6 the yoke is adjusted relatively to the guide by loosening one of the screws 42 and tightening the other. In both forms the combined yoke and guide are adjusted lengthwise of the tangent by the nuts on the tangent, held by those nuts in adjusted position.

As will be evident to those skilled in the art, my invention permits various modifications without departing from the spirit thereof or the scope of the appended claims.

What I claim is:

1. In a gas meter the combination of a tangent, an elongated member surrounding the same and carrying a tangent post, a guide laterally movable within said member and having a passage for said tangent, said guide being composed of two parts having abutting faces and lateral flanges, adjusting means engaging the outer faces of said two parts and said tangent and means engaging said guide and said member for adjusting the same relatively to one another.

2. In a gas meter the combination of a tangent, an elongated member surrounding the same and carrying a tangent post, a guide laterally movable within said member and having a passage for said tangent, said guide being composed of two parts having abutting faces and lateral flanges, adjusting means engaging the outer faces of said two parts and said tangent, and means engaging said guide and said member for adjusting the same relativly to one another, said flanges being spaced away so as not to make binding engagement with said member.

3. In a gas meter the combination of a screw-threaded tangent, an elongated member surrounding the same and carrying a tangent post, a guide laterally movable within said member and having a passage for said tangent, said guide being composed of two parts having abutting faces and lateral flanges, holding means engaging the outer faces of said two parts and said tangent, and screw-threaded means engaging said guide and said yoke for adjusting the same relatively to one another, said flanges being spaced away so as not to make binding engagement with said member, said screw-threaded means extending through said member and one portion of said guide.

4. In a gas meter, the combination of a tangent, a guide mounted thereon, said guide comprising separable parts having abutting faces, means mounted on the tangent and engaging the outer faces of said separable parts to retain the same in effective position on said tangent, a post carrying member mounted on said guide and provided with an opening through which said guide extends, and means for effecting relative movement between said guide and said post carrying member, said guide and said post-carrying member having engaging surfaces for retaining one with relation to the other from movement in a direction longitudinally of said tangent.

5. In a gas meter, the combination of a tangent, a two-part guide longitudinally adjustable thereon, each part of said guide being provided with a guiding flange, a tangent post carrier mounted on said guide between said guiding flanges and provided with an opening through which said guide extends, and means mounted on the tangent and engaging said respective parts of the guide to retain the same in operative carrier guiding relation and in any desired position of longitudinal adjustment with respect to said tangent.

6. In a gas meter the combination of a tangent post carrying yoke having a rectangular opening therein, a tangent extending through said opening, a guide extending through said opening and having guiding flanges arranged adjacent the sides of said yoke, the guide being movable longitudinally of said opening and said guide being provided with an opening through which said tangent extends, means for adjusting the guide longitudinally of said opening, and means mounted on said tangent for adjusting the guide and said yoke longitudinally of the tangent.

In testimony whereof, I have signed my name to this specification this Sixth day of July, 1928.

RICHARD LEE DEZENDORF.